Oct. 7, 1969

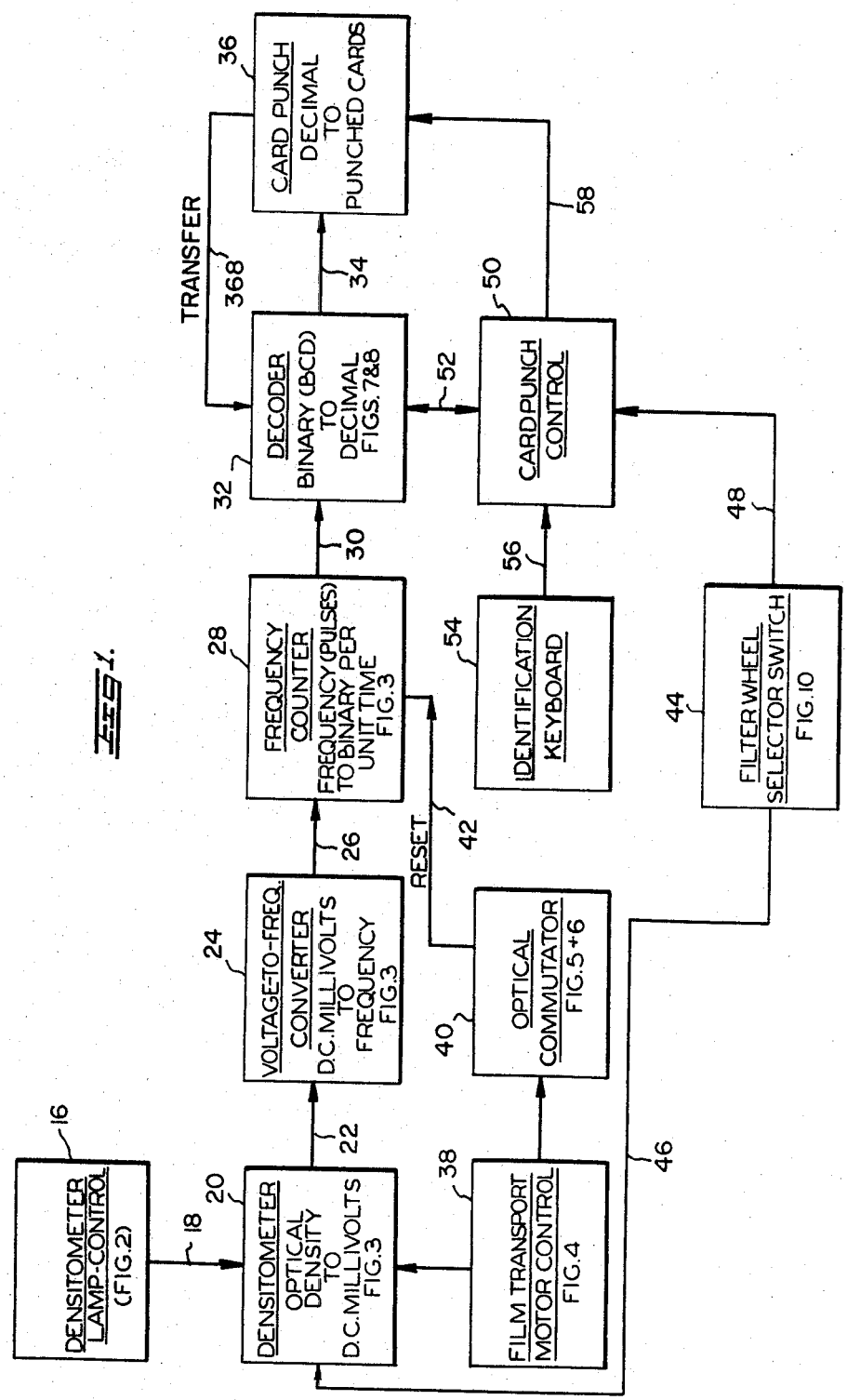

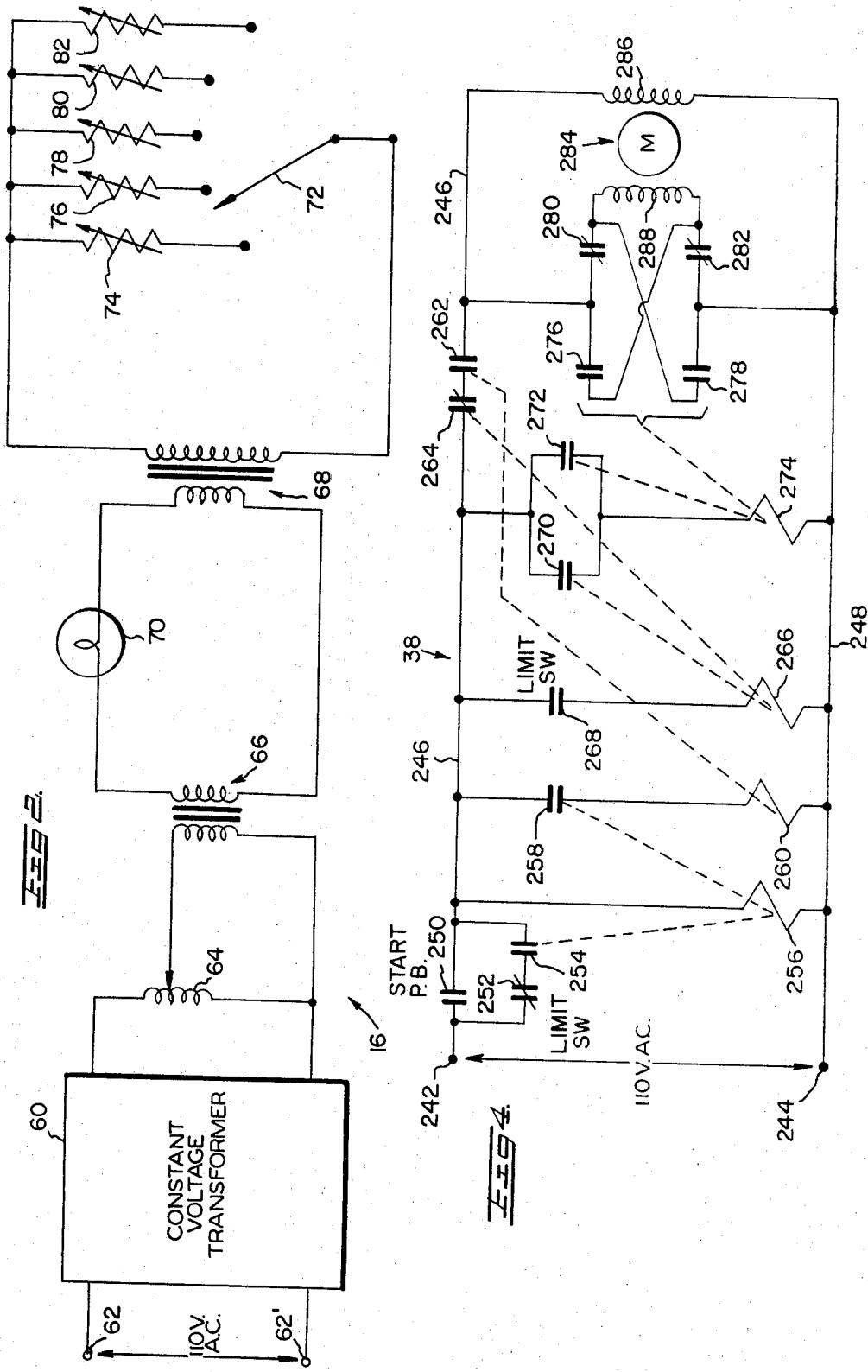

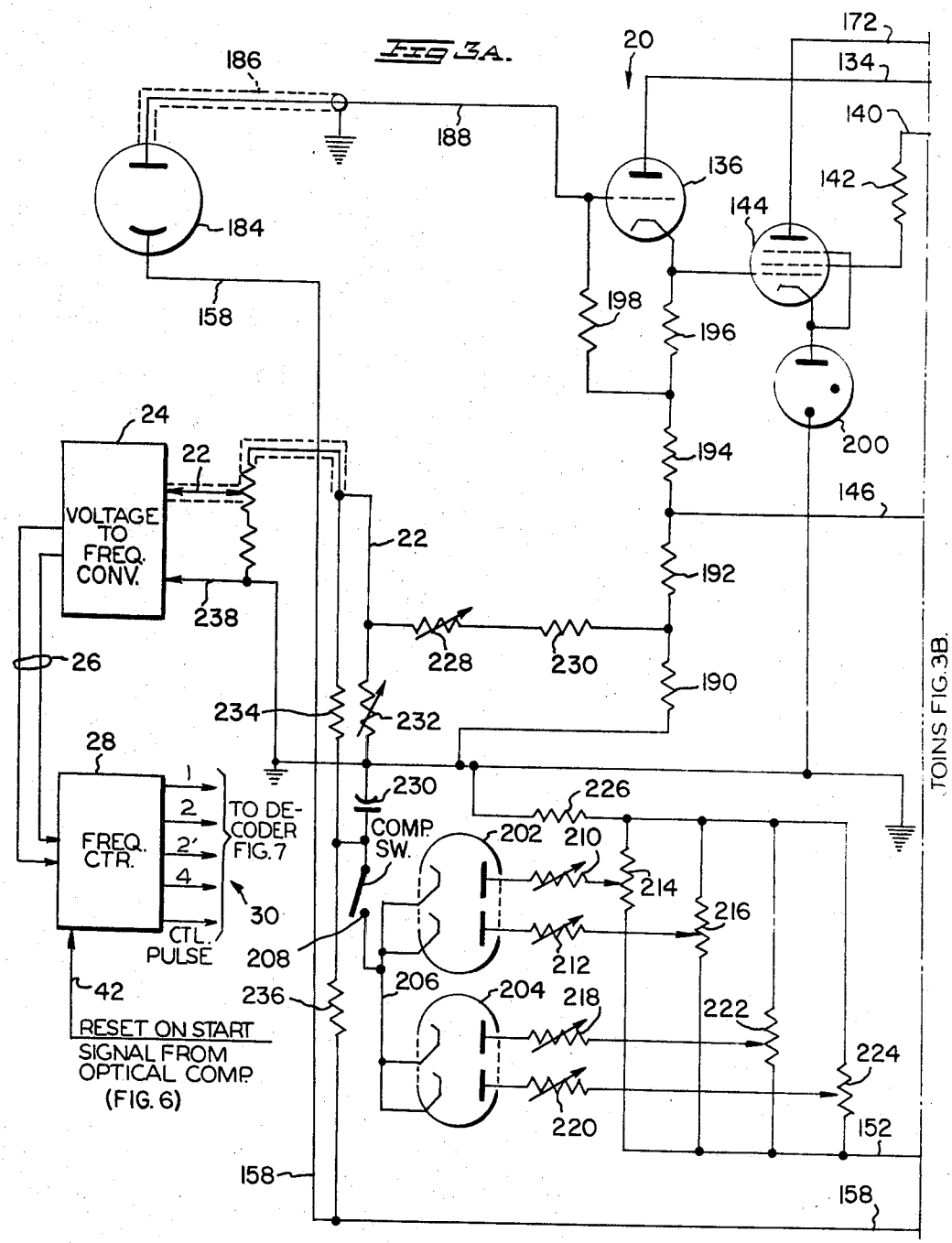

G. W. NICHOLS 3,471,242

DENSITOMETER ANALOG-TO-DIGITAL CONVERTER SYSTEM

Filed Feb. 18, 1966

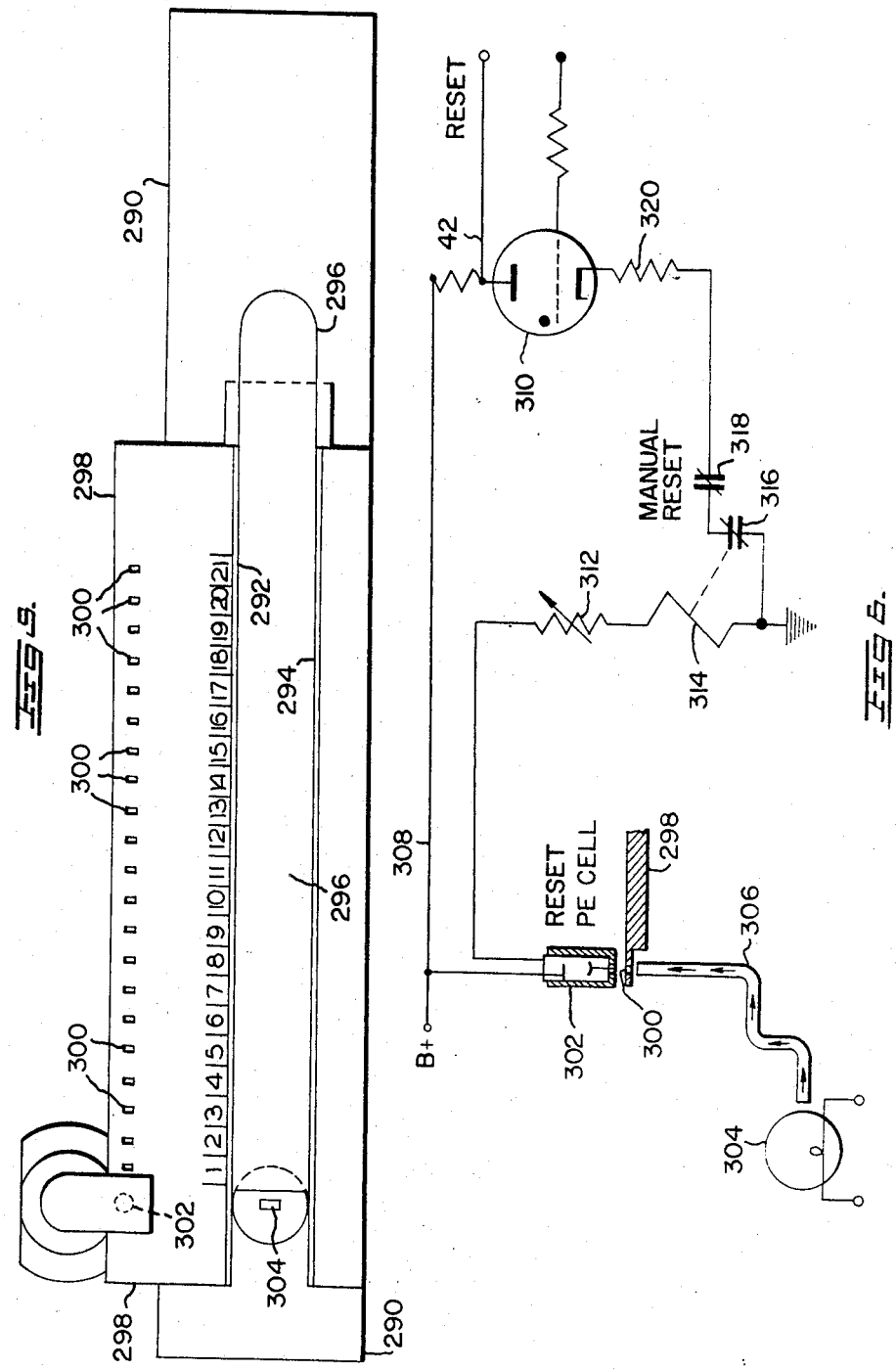

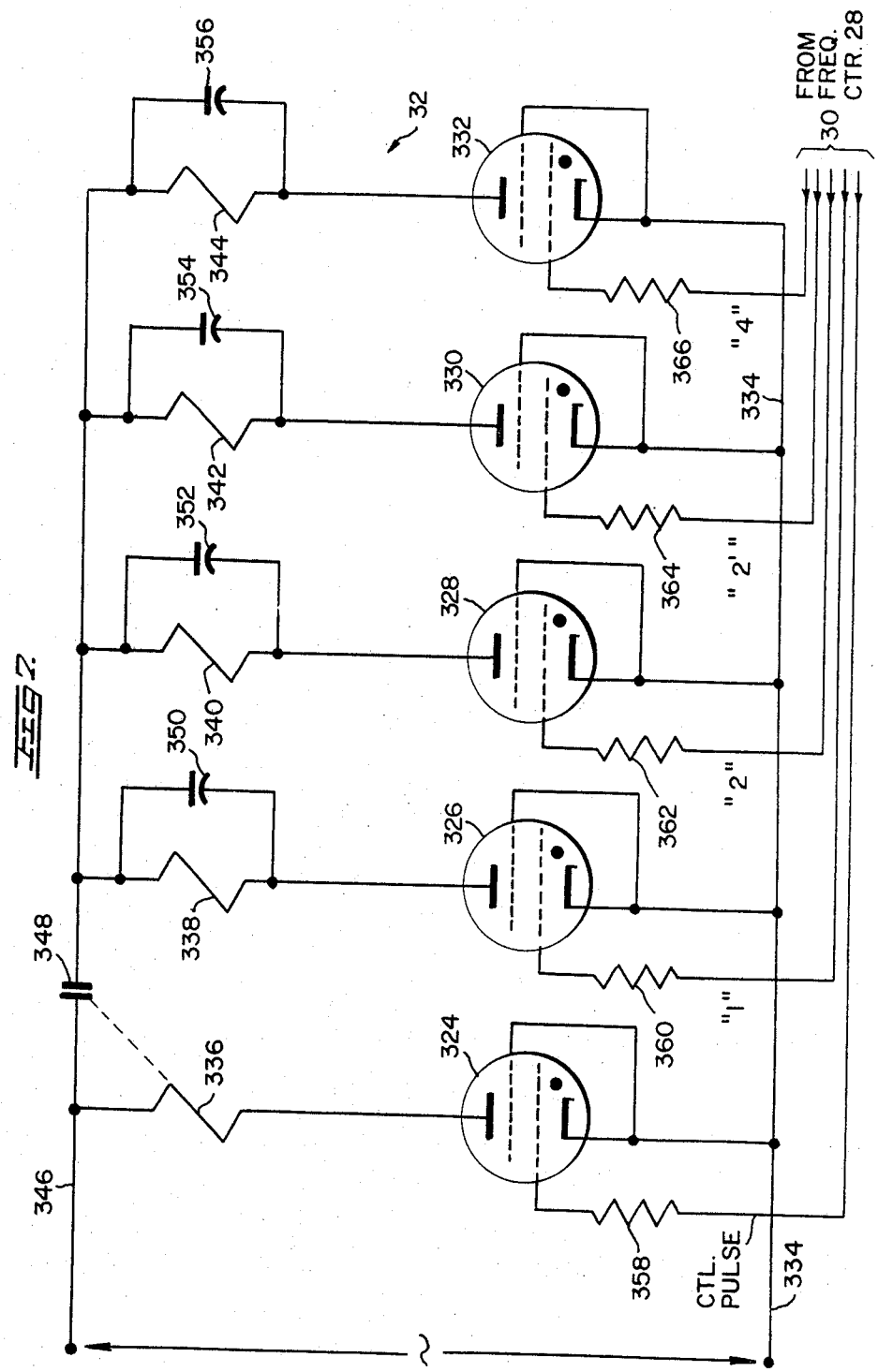

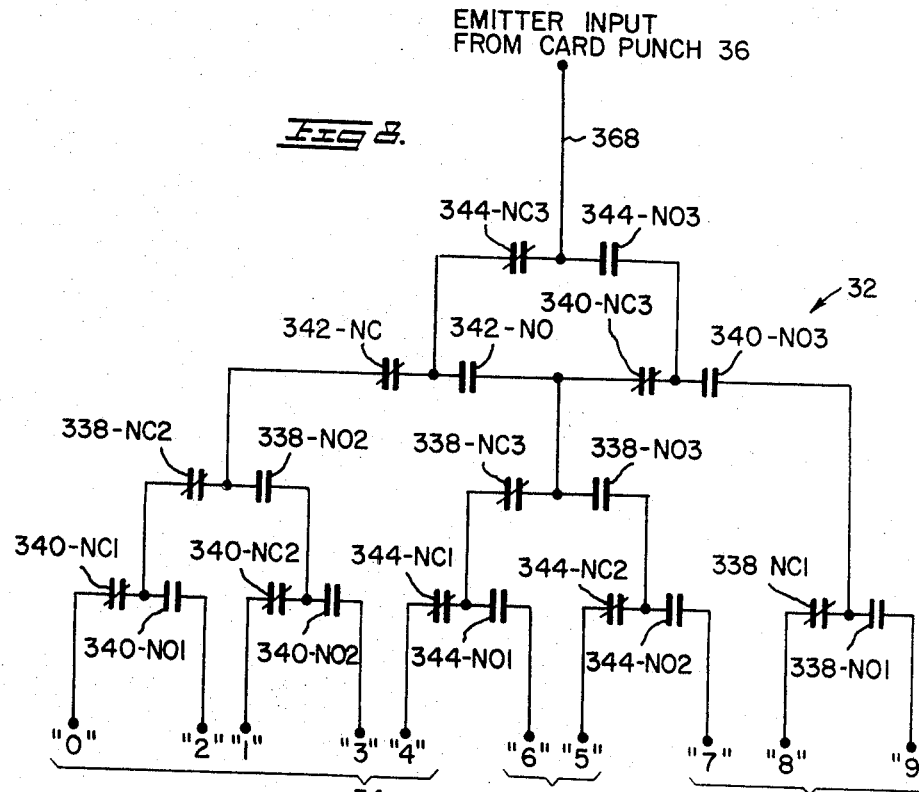
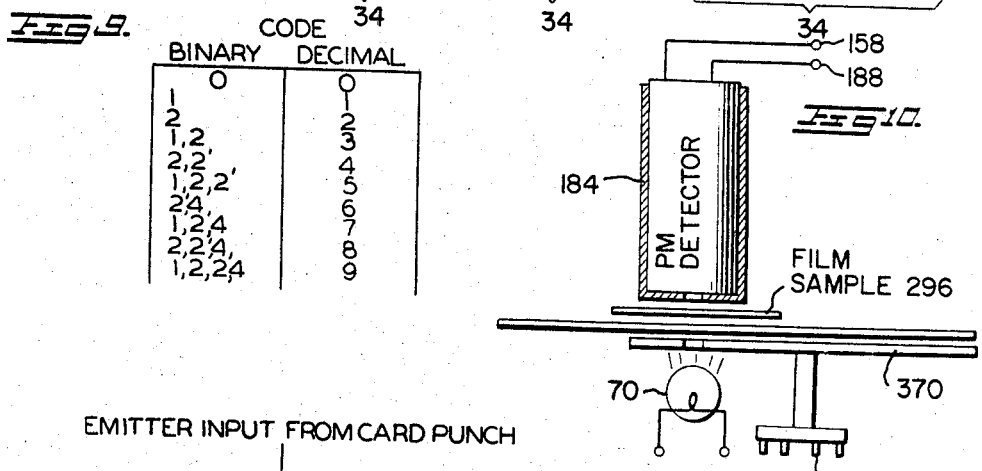
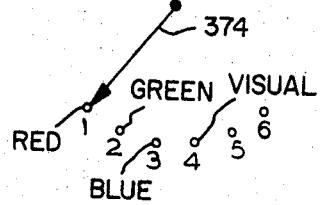
DECIMAL OUTPUT TO CARD PUNCH

United States Patent Office 3,471,242
Patented Oct. 7, 1969

3,471,242
DENSITOMETER ANALOG-TO-DIGITAL CONVERTER SYSTEM
Gordon W. Nichols, Binghamton, N.Y., assignor to GAF Corporation, New York, N.Y., a corporation of Delaware
Filed Feb. 18, 1966, Ser. No. 528,546
Int. Cl. G01n *21/22*
U.S. Cl. 356—202
9 Claims

ABSTRACT OF THE DISCLOSURE

A manifestation indicative of the optical density of a sample is recorded in a decimal code by maintaining the sample between a source of illumination and a phototube with a carriage and a commutator bar having apertures corresponding to interrogation portions of the sample, converting the output of the phototube to a D.C. voltage indicative of the sample optical density, converting such voltage to a signal having a related frequency, counting such frequency in a binary coded decimal notation, converting the latter to a decimal code, and recording such code to indicate the sample optical density.

---

This invention relates to measuring of optical density and more specifically to a method and apparatus for determining the optical density of a sample which may have a variation in translucency. The system includes conversion of the degree of translucency of the sample to an analog signal and, thereafter, recording the signal conversion to a digital code.

Known densitometer systems are cumbersome, difficult to operate and maintain and in many instances, fail to yield reproducible results. For example, in optical densitometer apparatus, transmission qualities of a sample may be compared to the transmission qualities of a reference. The comparison may then actuate a meter which indicates the density of the sample. To record the density, the meter reading usually must be visually determined and the indication of the meter recorded by any known manual means. The meter reading may be further correlated with samples of known density so that by converting the meter indication, the density of the sample can be determined.

From the foregoing description, it is readily evident that the procedure is extremely time-consuming and wasteful of personnel time. Although other known systems may be more efficient than the apparatus just described, they too, suffer with respect to efficiency, economics, etc.

If the determination and recording of densitometer measurements are to be truly successful, then a means must be employed for rapidly and accurately analyzing a sample, or a manifestation of the sample, and rapidly recording in some permanent manner and in a readily intelligible form, the measurement indicative of the density of the sample. The present invention is directed toward that end by providing a method and apparatus for rapidly interrogating a section of film which may either be the sample or which bears an indication of the density of the sample and thereafter converting the information so derived from the interrogation into a form which is permanently recorded.

According, it is the principal object of the present invention to improve densitometer systems.

It is a further object of the present invention to improve densitometer systems of the analog-to-digital recording types.

It is a further object of the present invention to provide a densitometer system and method for rapidly and accurately recording information related to the density of a sample.

It is a further object of the present invention to provide a densitometer recording system and method for converting an analog signal, indicative of the density of a sample, to a digital form that may be conveniently recorded.

It is a further object of the present invention to provide a densitometer system for analyzing a sample and recording the results, the system being insensitive to random noise or other unwanted electrical signals.

It is a further object of the present invention to provide an apparatus for successively and automatically advancing a sample to be analyzed past an optical density determining station and for each station, recording the optical density of that portion in intelligible, usually numerical, terms.

It is a further object of the present invention to provide an apparatus for successively and automatically advancing samples, usually sections of film, to be analyzed past a density determining station and for each section, recording its density in an intelligible manner and further including means for exposing each sample to different selected hues of light radiation.

It is a further object of the present invention to provide a densitometer recording system and method for converting an analog signal, indicative of the density of a sample, to a digital form that may be conveniently recorded and including the intermediate steps of voltage-to-frequency conversion, frequency counting, and decoding.

These and other objects of the present invention are accomplished by positioning a film sample upon a moveable carriage. A commutator bar is supported by and advanced by the carriage and bears a plurality of apertures which when aligned with an optical path, permits the interrogation of a corresponding section of the film sample then positioned between a densitometer light source and a photoelectric pickup apparatus. The film sample transport control means successively advances the film sample past the reading or interrogation station until the selected areas have all been interrogated. At this time, the carriage is returned to its initial position, in which position it remains awaiting the insertion of a new sample. A filter wheel selector is incorporated at the interrogation station so that a separate set of density readings may be made on each sample using restricted wave lengths, for example, each of the primary colors, red, green and blue. In addition, a reading is usually made in white or visual light.

The transmission characteristics of each sample is determined by the light energy passing through the sample and permitted to excite the photoelectric pickup. The greater the quantity of light passing the sample, the lower the resistance of the photoelectric pickup device becomes so that a greater current flows in the device. The photoelectric pickup device may be of the photomultiplier type, the photomultiplier detecting the optical density of the film sample being measured. The output from the photomultiplier is amplified and then converted to a frequency related to the magnitude of the analog signal from the photomultiplier amplifier. A frequency counter is employed to count of signals or pulses over a predetermined time period and then convert this frequency into a code, the particular code being a modified binary coded decimal notation.

Thereafter, the binary coded decimal notation is converted to a decimal code which is recorded, for example, by punching a card. In addition to the recordation of the density, or a factor related to the density, of a sample in the punch card, means are employed for printing identification information relating to the origin, type, etc. of the sample and in addition, the card punch will record the density reading along with the selected hue to which the sample was exposed during that particular determination or interrogation.

In addition to the foregoing, it will be readily understood that the invention includes suitable control means for resetting, generating necessary control pulses, etc.

The invention both as to its organization and method of operation together with further objects and advantages thereof will best be understood by reference to the following specification taken in conjunction with the accompanying drawings in which:

FIGURE 1 is a block diagram of the invention, setting forth the functional relationships of the various elements that cooperate to form a complete density interrogation and recording system;

FIGURE 2 illustrates in schematic form, the densitometer lamp control circuit and the tap switch which permits an operator to preset the brightness of the densitometer lamp for each position of the filter wheel without interaction;

Figure 3B:
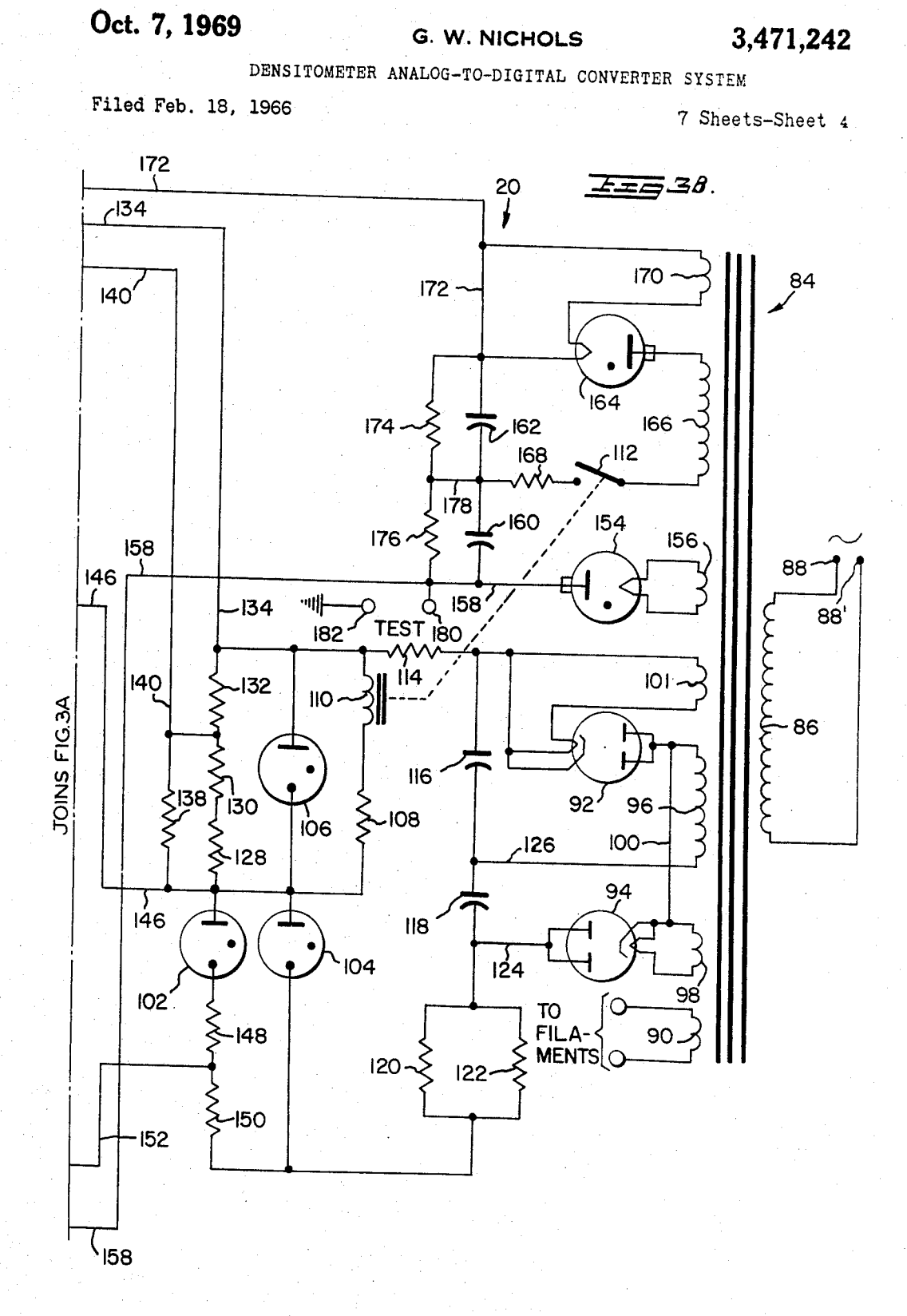

FIGURE 3A when placed side by side with FIGURE 3B illustrates the circuitry for converting the analog output signal from the photomultiplier tube, which is indicative of optical density, to a voltage, converting the voltage to a frequency related to the magnitude of the voltage and thereafter counting the frequency for converting the frequency to a coded form;

FIGURE 4 shows the motor control circuitry for advancing the film sample and the interrogation or density determination station;

FIGURE 5 is a plan piew of the optical commutator which supports the film sample and advances the sample past the interrogation station, along with the means for generating the timing sample pulses;

FIGURE 6 is a schematic view showing the passage of the carriage between the light source and a photocell for generating a start or interrogation signal;

FIGURE 7 and FIGURE 8 illustrate in schematic form the circuitry for converting the modified binary coded decimal notation from the frequency counter of the FIGURE 3A to a decimal code which may be readily recorded;

FIGURE 9 is a chart illustrating the correlation and permitting the convenient conversion of binary code employed to the decimal code or vice versa;

FIGURE 10 is an elevational view, partly in section, of a sample positioned between the densitometer light source and the photomultiplier detector and further illustrating the filter wheel and selector switch; and FIGURE 11 illustrates the switch for indicating the position of the selector switch in the FIGURE 10 to the card punch so that the record recorded in the card may be identified along with the color which it represents.

With reference to the block diagram of the FIGURE 1, a block 16 illustrates the densitometer lamp control which will be discussed in detail with subsequent reference to the FIGURE 2. The densitometer lamp control circuitry permits an operator to preset the brightness of the lamp or light source for each position of a filter wheel without interaction. Each sample may be exposed to the primary colors of red, green, and blue as well as to white or visual light. The filter wheel provides such exposure. A different brightness is required for each filter wheel position due to the filter density and a spectral response of the photomultiplier tube. The densitometer lamp control is supplied with a regulated voltage so as to eliminate or minimize errors due to fluctuating line voltages.

With continued reference to the FIGURE 1, the output of the densitometer lamp control block 16 is directed via a conductor 18 to a densitometer block 20. The densitometer in the block 20, which will be discussed in detail with subsequent reference to the FIGURE 3, converts optical density to a D.C. voltage in the millivolt range.

The densitometer includes a highly regulated power supply and accepts the output of the photomultiplier detector which is supplied to the grid of an amplifying tube. Although a vacuum tube and gas tube embodiment is disclosed, it will be readily evident to those skilled in the art that the practice of the invention is not limited to this type of embodiment but will operate equally well with solid-state circuitry.

The output from the detecting photomultiplier will vary the current through the amplifier path and this output is indicated on a conductor 22 to a block 24 of the FIGURE 1 which converts this voltage to a frequency related to the magnitude or amplitude of the D.C. voltage. The greater the voltage, the higher the frequency. That is to say, the voltage-to-frequency converter illustrated in the block 24 of the FIGURE 1 converts a D.C. millivolt input on the conductor 22 from the densitometer of the block 20 to a directly proportional frequency in pulses per second. The output in the form of pulses on a conductor 26 is directed to a frequency counter in the block 28 of the FIGURE 1 and the frequency counter is employed to totalize the output pulses for a predetermined or precise length of time such as the number of pulses counted over a period of 100 milliseconds. The output from the frequency counter in the block 28 is converted to a modified binary-to-coded decimal form and supplied over a conductor 30 to a block 32 of the FIGURE 1 which serves to decode the BCD to decimal notation.

The frequency counter of the block 28 of the FIGURE 1, when totalized, has available the BCD output and in order to record the data in intelligible fashion, for example, in a card punch, a BCD decoder is required as interface equipment. Any type of decoder may be employed and a thyratron type decoder has been found to be a convenient answer for converting the BCD output to a decimal output notation.

With continued reference to the FIGURE 1, while the frequency counter of the block 28 is counting, a voltage of one polarity generated in the frequency counter is supplied to a control grid of the decoder in the block 32. This output inhibits the decoder in the block 32. When the frequency counter in the block 28 has completed its counting cycle, a voltage of the other polarity appears at the control grid in the decoder of the block 32 thus energizing the required circuitry for converting the binary coded decimal input to a decimal output which is directed over a conductor 34 to a card punch 36. The card punch 36 may be an IBM 526 card punch or a card punch of similar construction which will convert input data into the required recordation of apertures formed in a punch card.

While the foregoing brief description of the FIGURE 1 relates generally to the electronics of the system, the remaining blocks of the FIGURE 1 relate generally to the mechanical nature of the apparatus. More specifically, a necessary part of the system is a method for transporting the film sample under the densitometer measuring head or densitometer interrogation station. Such is affored by the block 38 of the FIGURE 1 which will be described in detail with subsequent reference to the FIGURE 4. A carriage forming a part of an optical commutator in a block 40 is advanced by a motor in the block 38. The carriage of the optical commutator of the block 40 transports the film sample and has an optical commutator bar which generates timing pulses for determining an interrogation or density determination interval. When a film strip sample is properly positioned in the carriage of the block 40, the optical commutator, which is an integral part of the carriage, photoelectrically signals the frequency counter of the block 28 via a reset conductor 42 to reset and count the pulses emitted by the voltage-to-frequency converter of the block 24.

The optical commutator of the block 40 includes a photocell and a fiber optic cable to direct light from either a separate lamp or from the densitometer lamp of the block 16. The light from the source passes through the fiber optic cable to the back edge of the carriage. As the motor of the block 38 advances the carriage, a commutator bar normally obstructs the light from striking the phototube. A series of substantially equally spaced apertures appear in the commutator bar and when an aperture moves between the fiber optic cable and the photocell, the light incident upon the photocell lowers the resistance of the photocell, permitting an increase in the current so as to energize a relay. The energization of the relay generates a reset signal over the conductor 42 to indicate to the frequency counter of the block 28 that the frequency counter is to totalize.

In color densitometry, a separate set of density readings is recorded on each film sample in each of the primary colors of red, green and blue and in white or visual light. As shown in the FIGURE 1, a filter wheel and filter wheel selector switch are indicated in a block 44, the filter wheel being positioned in the optical path between the light source and the photomultiplier in the densitometer of the block 20. The mechanical link to the densitometer 20 is indicated by line 46 and in order to identify the punched information on the punch card fabricated by the card punch of the block 36, a cable 48 (a plurality of conductors, one for each color and any desired number of spares) will carry this information from the block 44 to a card punch control indicated in block 50. The card punch control 50 communicates with the decoder of the block 32 via a two-way cable 52 and also receives information from an identification keyboard 54 via a cable 56. Any further identification of the sample may be entered manually by the identification keyboard 54, which along with the card punch control of the block 50, is included in a card punch which may be purchased and is readily available on the open market. The card punch control 50 communicates with the card punch via a group of conductors indicated as a cable 58.

Although the foregoing description may suffice for certain purposes, a detailed description will now be set forth. More specifically, the densitometer lamp control of of the FIGURE 2 was indicated as the block 16 of the FIGURE 1. The circuitry of the FIGURE 2 permits an operator to preset the brightness of the densitometer lamp for each position of the filter wheel without interaction. A constant voltage transformer 60 is supplied line voltage via a pair of input terminals 62 and 62'. The output of the constant voltage transformer 60 is coupled to an auto-transformer 64 which supplies a coarse adjustment for the densitometer lamp. The output of the auto-transformer 64 controls the input to a filament transformer 66. On the secondary side of the transformer 66, the filament winding of a power transformer 68 is coupled in series with a densitometer lamp 70. In a practical embodiment of the invention which was constructed and operated in accordance with the principles of the present invention, the transformer 66 was a 10-ampere filament transformer. The primary winding of the power transformer 68 was 6.3 volts while the secondary winding of the transformer 68 was 850 volts. The densitometer lamp 70 was a 6 volt lamp. Coupled to one end of the secondary winding of the transformer 68 is a filter wheel tap switch 72 and to the other end of the secondary winding of the transformer 68 are a plurality of variable resistors 74, 76, 78, 80 and 82. To vary the light intensity from the densitometer lamp 70, the variable resistors 74, 76, 78, 80 and 82 are set at different resistance values. When the filter wheel tap switch 72 engages the terminal connected to one of the variable resistors 74, 76, 78, 80 or 82, the resistance is shunted across the secondary winding of the transformer 68. If one of the variable resistors 74 through 82 is at zero ohms, the reflected impedance from the secondary winding of the transformer 68 to the primary winding of the same transformer is zero and the transformer 68 is effectively shorted thus permitting the densitometer lamp 70 to illuminate at full brillance. In the event that the entire resistance is shunted across the secondary winding of the transformer 68, the reflected impedance in the primary winding of the transformer 68 produces a voltage drop of approximately two volts across the winding when it is in series with the densitometer lamp 70. A typical maximum value for the resistors 74 through 82 is 10,000 ohms.

A different brightness is required for each of the filter positions due to the filter density and the spectral response of the phototube receiving the impinging light through the film sample. It will be recalled that each sample is exposed to the primary colors of red, blue, green and a fourth exposure to white or visual light. The filter wheel tap switch 72 is mounted on the filter wheel, to be hereinafter described, and after the variable resistors 74, 76, 78, 80 and 82 are assigned the particular color or hue corresponding to the exposure of that particular hue to the sample, the variable resistor would be set at a particular value. Experimentation and practice will dictate the selection of the most desirable value for each resistance. The filter wheel tap switch 72 along with the variable resistors 74 through 82 may be termed the "zero" control for the densitometer system.

When the FIGURE 3A is placed side by side with the FIGURE 3B, the FIGURE 3A being to the left of the FIGURE 3B, the densitometer amplifier 20 of the FIGURE 1, the voltage-to-frequency converter 24 of the FIGURE 1, and the frequency counter 28 of the FIGURE 1 are all illustrated in detail. The FIGURE 3A includes primarily the densitometer amplifier 20, the voltage-to-frequency converter 24, and the frequency counter 28 while the FIGURE 3B illustrates the power supply for the apparatus of the FIGURE 3A.

The regulated power supply of the FIGURE 3B includes an input transformer 84 having a primary winding 86 which is supplied line voltage via a pair of terminals 88 and 88'. A plurality of secondary windings are coupled from the power transformer 84 which includes a filament winding 90 from which filament voltage may be supplied to those tubes requiring such supply. In addition, a pair of rectifiers 92 and 94 are coupled to a pair of secondary windings 96 and 98, as shown. The anodes of the rectifier 92 are coupled to the cathode of the rectifier 94 by a conductor 100. The cathode and heater of the rectifier 92 is coupled to a secondary winding 101.

A pair of voltage regulating tubes 102 and 104 are in parallel relationship while a voltage regulating tube 106 is in series relationship with the voltage regulating tubes 102 and 104. A series resistor 108 and a relay coil 110 are coupled from the plate of the voltage regulating tube 104 to the plate of the voltage regulating tube 106. The relay coil 110 actuates a contact 112 for supplying plate voltage to a plurality of thermionic discharge devices, to be hereinafter described. A resistor 114 is coupled between the plate of the voltage regulating tube 106 and the cathode of the rectifier 92. In parallel with the voltage tubes 104 and 106 is a series circuit including a capacitor 116, a capacitor 118, and a pair of parallel coupled resistors 120 and 122. The anodes of the rectifier 94 are coupled between the capacitor 118 and the common point of the resistors 120 and 122 by a conductor 124. In addition, the opposite end of the secondary winding 96 is connected by a conductor 126 to the common point of the capacitors 116 and 118.

In parallel with the voltage regulating tube 106 of the FIGURE 3B is a group of resistors 128, 130 and 132 and the common point from the resistor 132 and the plate of the voltage regulating tube 106 supplies plate voltage (B+) via a conductor 134 to the plate of a triode 136 of the FIGURE 3A. With reference again to the FIGURE 3B, a resistor 138 is in parallel with the resistors 128 and 130 and supplies screen voltage via a conductor 140 through a resistor 142 and to the screen grid of a pentode 144 of the FIGURE 3A. In a practical embodiment of the invention which was constructed and operated in accordance with the principals of the present invention, the voltage supplied to the conductor 134 was approximately 175 volts while the voltage supplied to the screen grid of the pentode 144 via the conductor 140 was approximately 143 volts. A small positive voltage, of approximately 30 volts, is supplied via a conductor 146 from the common point of the resistors 128 and 138 to a group of series resistors, to be hereinafter described, coupled to the cathode of the triode 136 of the FIGURE 3A. A pair of resistors 148 and 150 are connected to the ignitor or cathode of the voltage regulating tube 102 and then to the ignitor of the voltage regulating tube 104 as well as to the resistors 120 and 122. A negative voltage of approximately −58 volts is derived from the common point of the resistors 148 and 150 and supplied via a conductor 152 to a group of parallel variable resistors to be hereinafter described with reference to the FIGURE 3A.

With continued reference to the FIGURE 3B, a gas rectifier tube 154 has its cathode coupled in series with a secondary winding 156 of the power transformer 84 while its anode is connected to a conductor 158. From the conductor 158, a pair of series capacitors 160 and 162 are connected to the cathode of a gas rectifier 164. The anode of the gas rectifier 164 is coupled to a secondary winding 166 of the power transformer 84 and then through the switch 112 and a resistor 168 to the common point of the capacitors 160 and 162. The cathode of the rectifier 164 is coupled in series with a secondary winding 170 of the power transformer 84 and then to a conductor 172 which is connected to the capacitor 162. The conductor 172 supplies anode voltage to the pentode 144 of the FIGURE 3A, a typical value of the anode voltage being approximately 1120 volts.

In parallel with the capacitor 162 of the FIGURE 3B is a resistor 174 and in parallel with the capacitor 160 is a resistor 176. The common junction of the capacitors 160 and 162 is coupled via a conductor 178 to the common junction of the resistors 174 and 176. A test point is provided by a terminal 180 coupled to the conductor 158 and a terminal 182 connected to ground. Insertion of a test instrument between the terminals 180 and 182 will permit one to check the voltage on the conductor 158 and a typical value which was employed in apparatus constructed and operated in accordance with the principals of the present invention was approximately −265 volts. The negative voltage on the conductor 158 is supplied to the FIGURE 3A, to be presently described.

The circuitry of the FIGURE 3A, when supplied the necessary operating voltages by the circuit of the FIGURE 3B, performs as a densitometer amplifier which converts optical density to a D.C. voltage. Preferably, the densitometer amplifier should produce an output voltage which is linear with the density of the film samples encountered. Although the disclosure of the FIGURE 3A employs thermionic discharge devices, it will readily be understood by those skilled in the art that solid state or other amplifier types may be equally utilized in the practice of the invention.

A photomultiplier tube 184 of the FIGURE 3A has its anode, which is coupled through a shielded ground 186, connected to the control grid of the triode 136 via a conductor 188. The photocathode of the photomultiplier tube 184 is connected to the negative voltage supplied by the conductor 158 of the FIGURE 3B. A plurality of resistors are connected in series from ground to the cathode of the triode 136 and these resistors include the resistors 190 (the closest resistor to ground), 192, 194 and 196. A by-pass resistor 198 is connected from the control grid of the triode 136 to the common point of the resistors 194 and 196. The positive voltage supplied from the FIGURE 3B on the conductor 146 is coupled to the common junction of the resistors 192 and 194, as shown. Voltage regulation of the pentode 144 is further achieved by the inclusion of a voltage regulating tube 200 in the cathode to ground circuit of the pentode 144.

A pair of double diodes 202 and 204 have their cathodes coupled to a common conductor 206 which is connected to a compare switch contact 208. The anodes of the diode 202 are connected, respectively, to a pair of variable resistors 210 and 212 which resistors 210 and 212 are connected to variable resistors 214 and 216. Similarly, the anodes of the diode 204 are coupled to variable resistors 218 and 220 which likewise are connected to, respectively, a pair of variable resistors 222 and 224. The resistors 214, 216, 222, and 224 are supplied a negative voltage via the conductor 152 from the FIGURE 3B. The other end of the resistors 214, 216, 222 and 224 are connected through a resistor 226 and then to ground.

The input on the shielded conductor 22 to the voltage-to-frequency converter 24 is via a conductor from the common junction of the resistors 190 and 192 which includes a variable resistor 228 and a fixed value resistor 230. The output from the photomultiplier tube 184 to the control grid of the triode 136 functioning as a cathode follower, will vary the current in the resistors 190, 192, 194 and 196 in the cathode circuit of the triode 136 and thereby cause a certain voltage to exist on the conductor to the control grid of the pentode 144.

The output from the compensation switch which engages the terminal 208, is connected to the conductor 22 by a capacitor 230 and a variable resistor 232. The common junction of the capacitor 230 and the variable resistor 232 is at ground, as noted. In addition, a resistor 234 is connected from the conductor 22 to the compensation switch while a resistor 236 is connected to the negative voltage supplied by the conductor 158 from the FIGURE 3B. A reference voltage is established for the voltage-to-frequency converter 24 by the coupling of a conductor 238 to ground, as shown.

The pentode tube 144 establishes the relationship of the high voltage to ground by acting as a series pass tube. As the signal goes more negative (more light on the photomultiplier tube 184), the pentode tube 144 conducts less thereby causing a larger voltage drop across the tube 144, causing the high voltage to be more positive in relation to ground. This makes the high voltage negative closer to ground, causing a reduction in voltage on the photomultiplier 184 dynodes. This decrease of dynode voltage reduces the amplification of the photomultiplier tube 184, making it effectively less sensitive to light. In turn the photomultiplier tube 184 anode current is reduced causing the cathode follower triode 136 and the pentode 144 to go less negative, and this causes a smaller voltage drop across the pentode 144. Thus, it is seen that the whole circuit is basically a feedback circuit. By this automatic adjusting of photomultiplier gain by automatically varying the high voltage minus line in relation to ground, the range of the photomultiplier tube 184 is extended from a range of 0–2 density to a range of 0–4 density or greater. The output voltage to the voltage-to-frequency converter 24 is obtained by resistance dividing the high voltage minus to a useable level and the output is this voltage in relation to ground. The diodes 202 and 204 are used for compensation to linearize the voltage curve.

The voltage-to-frequency converter 24 of the FIGURE 3A, supplies a series of pulses, at a frequency related to the voltage supplied to it, via the conductors 26 to the frequency counter 28. The voltage-to-frequency converter 24 converts D.C. millivolts to frequency or pulses per second. The frequency counter 28 counts the pulses supplied to it by the voltage-to-frequency converter 24 for a predetermined period of time, for example, 100 milliseconds, after the frequency counter 28 is reset by a reset pulse on the conductor 42 which is derived from the optical comparator of the FIGURE 6 to be hereinafter described. The output of the frequency counter 28 is in binary coded decimal form (BCD) on the conductors 1, 2, 2′ and 4. These conductors are indicated by the arrow 30. In addition, a control pulse is supplied, as indicated.

As previously set forth, the voltage-to-frequency converter 24 and the frequency counter 28 combine, in essence, to form a digital volt meter which is insensitive to random high-frequency noise which is inherent by nature in photomultiplier tube circuits such as that employed in the densitometer of the present invention. The voltage-to-frequency converter 24 converts a D.C. millivolt input to a directly proportional frequency, or pulses per second. For example, 100 millivolts input would generate 100,000 pulses per second. Symmetrical noise such as a 60-cycle sine wave superimposed on the input would have a self-compensating effect when the pulses are totalized for 100 milliseconds or longer. This fact is of value in densitometric applications where a 60-cycle ripple may be present because of the high impedance of the photomultiplier output or because of ripple on the densitometer light source. As set forth, the frequency counter 28 is employed to totalize these pulses for a precise length of time, such as for 100 milliseconds.

An integral part of the densitometer system of the present invention is the means for transporting a film sample under the densitometer measuring or interrogation photomultiplier tube. A carriage supports and transports the film sample and the optical commutator bar, both of which will hereinafter be described. Precision one-way limit switches are employed to reverse the carriage when it has reached the right-hand extremity of travel and to stop the carriage when it has returned to its original position. The limit switches operate from one direction only. The densitometer carriage supporting and transporting the film sample travels from right to left during the density measuring cycle and automatically returns to its original position. The one-way limit switches are employed so as to eliminate the usual lockout relays when the carriage returns over a limit switch. When the carriage is in the normal stopped position, at rest, the carriage-return actuator is to the right of the carriage-return limit switch. The inertia of the drive apparatus causes the carriage to coast to this position when it is returned.

The film transport motor control 38 shown in block diagram in the FIGURE 1 is illustrated in detail with reference to the FIGURE 4. An alternating supply voltage is applied to a pair of terminals 242 and 244 which are coupled to bus conductors 246 and 248, respectively. A start push button 250 is interposed in the conductor 246. By-passing the start push button 250 is a limit switch 252 and a pair of normally open contacts 254 controlled by a relay coil 256. The relay coil 256 bridges the conductors 246 and 248 and has associated therewith an additional pair or normally open contacts 258. The closing of the contacts 258 operates a relay coil 260 since the contacts 258 and the relay coil 260 are in bridging relationship to the conductors 248 and 246. The actuation of the relay coil 260 closes a pair of normally open contacts 262 which are in series with the supply conductors 246 but behind a pair of normally closed contacts 264 which are controlled by a relay coil 266. A limit switch 268 is in series with the relay coil 266 and bridged across the supply conductors 246 and 248. The relay coil 266 also controls a set of normally open contacts 270 which are in parallel with a similar pair of normally open contacts 272, the contacts 272 being under the control of a relay coil 274. In addition, the relay coil 274 controls two pairs of normally open contacts and two pairs of normally closed contacts, the normally open contacts being identified as 276 and 278 and the normally closed contacts being identified as 280 and 282.

A motor 284 includes a pair of field coils 286 and 288, the coil 286 being across the conductors 246 and 248 while the field coil 288 is bi-directional in current flow due to the arrangement of the normally open contacts 276 and 278 and the normally closed contacts 280 and 282. Actuation of the relay coil 274 will reverse the current flow in the coil 288 and thereby reverse the direction of rotation of the motor 284. The relay coils 260 and 266 are time-delayed relays having a predetermined delay period, say, approximately 1 second.

When the start push button 250 is depressed, the relay 256 energizes and seals in through the limit switch 252 which is normally closed and the contacts 254 which are normally open. Concurrently, the contacts 258 close due to the flow of current through the relay coil 256 and energize the relay coil 260 at the expiration of its time-delay period which, as set forth, may be approximately one second. When the relay coil 260 becomes energized, power is applied directly to the field coils 286 and 288 of the motor 284 due to the closing of the normally open contacts 262. Thus, power is applied to the armature of the motor 284, the current path being from the conductor 246, through the normally closed relay contacts 280, the coil 288, the normally closed relay contacts 282 and to the conductor 248.

With current so supplied to the motor 284, the motor 284 drives the carriage (to be discussed with reference to the FIGURE 5) from right to left. Almost immediately, the carriage-return actuator passes over the carriage-return limit switch 252 but since a one-way switch is employed, the limit switch 252 does not operate. The carriage continues until the limit switch 268 is operated by an actuator on the carriage. When the limit switch 268 closes, the time-delay relay coil 266 energizes immediately but holds in the energized position for, say, one second after power is removed from the relay coil 266. At this point, the normally closed contacts 264 drop open thus opening the motor circuit allowing the carriage to coast to a stop past the limit switch 268. Simultaneously, the normally open contacts 270 controlled by the time-delay relay coil 266 energizes the relay coil 274, which seals in through its own normally open contacts 272. That is to say, since the relay coil 274 picked up, the relay contacts 272 are closed thus maintaining current flow through the relay coil 274. With the relay coil 274 now actuated, the normally closed contacts 280 and 282 become open and the normally open contacts 276 and 278 close which reverses the current through the winding 288 of the motor 284. As soon as the carriage has coasted past the limit switch 268, the limit switch 268 opens and the time-delay relay 266 drops out after one second. At this point, the previously open contacts 264 become closed and the motor 284 operates in the opposite direction causing the carriage to drive from left to right. Though the carriage immediately passes over the limit switch 268, this switch does not operate since the limit switch 268 operates in one direction only. At the end of the carriage return cycle, the limit switch 252 will open its contacts thus dropping out the relay coil 256 and the contacts 254 and 258 associated therewith. In addition, the relay coil 274 is no longer supplied current so that the contacts 272, 276 and 278 open while the contacts 280 and 282 become closed. With the contacts 258 now open, the relay coil 260 is inhibited to current flow and the contacts 262 open. With the limit switch 268 open, the contacts 264 close and the contacts 270 open. Thus, the motor 284 coasts the carriage past the limit switch 252 to a stop.

Thus, the film transport motor control of the FIGURE 4 provides accurate and precise movement for advancing the carriage supporting the film sample past the light source 70 and the photomultiplier tube 184.

The optical commutator and carriage of the block 40 of the FIGURE 1 is shown in detail in the FIGURES 5 and 6. With reference to the FIGURE 5, a carriage 290, previously referred to, is advanced by the film transport motor of the FIGURE 4. The carriage 290 includes a pair of film receiving channels 292 and 294 which receive a film sample 296. A commutator bar 298 is secured to the carriage 290 and bears a plurality of apertures 300 which when aligned with a photoelectric cell 302 will permit the frequency counter 28 of the FIGURE 3 to reset and commence its counting cycle. The photoelectric cell 302 receives illumination from a light source 304 via a light pipe 306 shown in the FIGURE 6. As the carriage 290 advances, successive apertures 300 will permit illumination from the light source 304 and the light pipe 306 to impinge upon the photoelectric cell 302, which is the reset photocell, as thus shown in the FIGURE 6.

With reference to the FIGURE 6, plate voltage is supplied via a B+ conductor 308 to the photoelectric cell 302 and a thyratron tube 310. The output of the photocell 302 is coupled in series with a variable resistor 312 and a relay coil 314 which controls a pair of normally closed contacts 316. The common junction of the relay coil 314 and the contacts 316 is at ground, as shown. In series with the normally closed contacts 316 is a pair of manual reset contacts 318 which are coupled to the cathode of the thyratron tube 310 via a resistor 320. A reset pulse is derived on a reset conductor 42 connected from the plate of the tube 310.

With continued reference to the FIGURES 5 and 6, when a film sample strip 296 is properly positioned in the carriage 290, the optical commutator 298 will photoelectrically signal the frequency counter 28 to reset and count the pulses emitted by the voltage-to-frequency converter 24. The illumination from the light source 304, which alternatively may emanate from the densitometer light source 70 of the FIGURE 2, passes through the fiber optic light pipe 306 to the back edge of the carriage 290, to actuate the photoelectric cell 302. As the motor drives the carriage 290, an opaque portion of the commutator bar 298 normally obstructs the light 304 from impinging upon the photoelectric cell 302. When an aperture 300 moves between the fiber optic cable 306 and the photoelectric cell 302, the light impinging upon the photoelectric cell 302 lowers the resistance of the photoelectric cell 302 permitting the current to increase and energize the relay coil 314. The relay contacts 316 associated with the relay coil 314 open and cause the thyratron tube 310 to become extinguished. The abrupt rise in voltage on the reset conductor 42 provides a reset signal permitting the frequency counter 28 to totalize.

The foregoing sequence of events continues until all positions, e.g., 21 in the embodiment of FIGURE 5, of the film sample 296 have been read and interrogated. During each of the sampling or interrogation positions, the car punch 36 of FIGURE 1 records the density of the portion of film strip 296 presently being read. After the film transport motor 284 of FIGURE 4 has completed driving the carriage 296 to its leftmost position, the carriage 290 is returned and remains in its original position until again actuated, usually after the removal of the present film sample 296 and insertion of a new film sample whose density is to be determined and recorded.

The decoder 32 of FIGURE 1 is illustrated in detail in FIGURES 7 and 8. The frequency counter 28, when totalized, has available a binary coded decimal output. The code is set forth in the FIGURE 9 which upon inspection, will readily indicate the code conversions from binary (actually a modified binary coded decimal) to decimal form and vice versa. The binary code of the left column of the FIGURE 9 is supplied to the circuit of the FIGURE 7 and the FIGURE 8, yields the decimal equivalent as set forth in the right column of the FIGURE 9. In order to punch the data to be recorded on punch cards on a card punch such as an IBM 526 card punch, the binary to decimal decoder is required as interface equipment.

As shown in the FIGURE 7, a plurality of thyratron tubes 324, 326, 328, 330 and 332 have their cathodes coupled to a line bus 334 and their anodes coupled through relay coils 336, 338, 340, 342 and 344 to a line bus 346. Suitable voltage is supplied to the line buses 334 and 346 such as 110 volts A.C. The relay coil 336 operates a pair of normally open contacts 348. A plurality of capacitors 350, 352, 354 and 356 by-pass, respectively, the relay coils 338, 340, 342 and 344. The output from the frequency counter 28 of the FIGURES 1 and 3A is supplied via the control pulse conductor, the "1" conductor, the "2" conductor, the "2'" conductor, and the "4" conductor to the control grid of the tubes 324, 326, 328, 330 and 332, respectively, via the control grid input resistors 358, 360, 362, 364 and 366. The relay coils 338, 340, 342 and 344 operate a plurality of normally open and normally closed relay contacts shown in the FIGURE 3.

With reference to the FIGURE 8, the relay contacts operated by a particular relay are identified by a prefix which includes the same identification given to its relay coil, followed by the designations NC signifying normally closed contacts or NO signifying normally open contacts, and lastly, by a suffix, except for the contacts associated with the relay coil 342, indicating the first set of contacts, the second set of contacts, etc. Whenever a relay coil is energized, all of the sets of contacts are involved. As an example, the relay coil 338 in series with the thyratron tube 326 of the FIGURE 7, controls the following contacts: 338–NC 1, 338–NO 1, 338–NC 2, 338–NO 2, 338–NC 3 and 338–NO 3. When current flows through the relay coil 338 upon the firing of the tube 326, all of the normally closed contacts associated with the relay coil 338 will open and all of the normally open contacts associated with that relay coil will close. The remaining contacts operated by their respective relays will not be discussed in detail since the foregoing example is believed illustrative of the contacts which are associated therewith and switched upon the passage of current through its associated relay coil. A conductor 368 of the FIGURE 8 from the card punch 36 of the FIGURE 1 transmits a transfer card signal which transfers the decimal output of the conductors 34 to the card punch 36 after the relay coils 338, 340, 342 and 344 of the FIGURE 7 have been either energized or have remained de-energized according to the output to be transferred.

With reference to the FIGURES 7 and 8, the operation of the circuitry will now be described. While the frequency counter 28 is counting, a negative voltage generated in the frequency counter 28 is applied to the control grid of the frequency tube 324 as a control pulse through the resistor 358. This maintains the tube 324 in its non-conducting state. When the frequency counter 28 has completed its counting cycle, a positive voltage now appears on the control pulse conductor to the control grid of the tube 324 causing the tube 324 to conduct which energizes the relay coil 336 and closes the relay contacts 348 associated therewith. This action applies plate voltage to tubes 326, 328, 330 and 332.

A positive voltage output from the frequency counter 28 indicates an "on" condition while a negative voltage indicates an "off" condition. For example, for the decimal digit 8, the following binary states would appear according to the code of FIGURE 9: 1—off, 2—on, 2'—on, and 4—on. Accordingly, positive pulses would appear on the 2 conductor, the 2' conductor and the 4 conductor so as to energize the tubes 328, 330 and 332, the tube 326 remaining in its non-conducting state. As the tubes 328, 330 and 332 fire, current now passes through the relay coils 340, 342 and 344 associated with their respective tubes. It will be noted that the plate supply voltage is A.C. and would normally tend to turn off the tube sixty times per second. However, since a gas tube such as the thyratrons employed in the circuit of the FIGURE 7 are effectively controlled rectifiers, the capacitors 350, 352, 354 and 356 which bridge the relay coils 338, 340, 342 and 344, respectively, will hold the relay coil associated therewith energized until the plate voltage is removed by the opening of the contacts 348 associated with the relay coil 336.

Therefore, immediately after the relay coil 336 is energized and closes its associated contacts 348, there is an individual relay coil for each binary code which is energized if the binary is "on" or de-energized if the binary is "off."

The decoding is accomplished by the circuit of the FIGURE 8 by the relay trees as shown and previously described. As the circuit is shown, no binary output of the counter is "on" so that all relays are de-energized and a circuit path exists from the conductor 368, through 344–NC 3, 342–NC, 338–NC 2, and 340–NC 1 to the "zero" output conductor.

In the previous example wherein a binary 8 was to be converted to a decimal 8, it will be recalled that the relay coils 340, 342 and 344 were energized. Accordingly, the contacts 338–NC 1, 338–NO 1, 338–NC 2, 338–NO 2, 338–NC 3 and 338–NO 3 remain as shown in the FIGURE 8; however, the remaining relay contacts reverse so that the normally closed contacts become open and the normally open contacts are closed. Therefore, a circuit path now exists from the conductor 368, through the contacts 344–NO 3, 340–NO 3, and 338–NC 1 to the "8" output conductor. The circuitry paths to all the other output digits are open or blocked.

The decoder of the FIGURES 7 and 8 may be readily modified by those skilled in the art to employ silicon controlled rectifiers instead of the thyratrons as shown, and the relay tree of the FIGURE 8 can be rearranged to decode a 1–2–4–8 code instead of the 1–2–2′–4 code which has been illustrated.

When the frequency counter 28 is reset by a pulse on the conductor 42 shown in the FIGURE 1, the positive signal on the grid of the control thyratron tube 324 becomes negative and at the first negative half of the A.C. sine wave on the plate of the tube 324, the tube 324 is extinguished which inhibits current flow through the relay coil 336. Accordingly, the relay contacts 348 associated with the relay coil 336 open and this in turn removes the plate voltage from the tubes 326, 328, 330 and 332. The circuit remains in this condition until the next interrogation cycle wherein a positive pulse will appear on the control pulse conductor to the control grid of the control tube 324. Thereafter, the cycle repeats according to the digits to be decoded.

In color densitometry, a separate set of density readings may be performed on each film sample in the primary colors of red, green, and blue and in white or visual light. As shown in the FIGURE 10, a filter wheel 370 is employed in the optical path between the light source 70 and the photomultiplier detector 184. The film sample 296 is interposed in the light path so as to be exposed to the hue generated by the source of illumination 70 in cooperation with the filter wheel. The filter wheel 370 includes an operating handle 372 which may be actuated to change testing color as desired.

In order that the recorded information which is punched in cards by the card punch 36 be complete, it is necessary to identify to the card punch 36 which color is being exposed to the film sample. This is accomplished by a rotary tap switch 374 which may be mounted on the filter wheel 370 and which provides a direct digit code for each color to the card punch 36. For example, the color red may be assigned to the contact "1," green may be assigned to the contact "2," blue may be assigned to the contact "3," and the reading in visual or white light may be assigned to the contact "4." The contacts "5" and "6" are redundant. No decoding for this operation is necessary since the emitter pulse for the card column selected is fed directly through the tap switch 374 to the respective punch magnet in the card punch 36.

THE OPERATION

The detailed operation of the densitometer system will be set forth with reference to the FIGURES 2–8. For the purposes of explanation, it will be assumed that all supply voltages are being applied and that the system is ready for operation except for positioning of a film sample in the carriage of the FIGURE 5. Furthermore, it will be assumed that sufficient cards are available to the card punch 36 so as to record the information obtained from a film sample.

With the light source 70 of the FIGURE 2 providing illumination in a path directed toward the film sample, it will be assumed that experimentation has provided sufficient knowledge so that the variable resistors 74, 76, 78, 80 and 82 of the FIGURE 2 have been set at optimum values so that when the switch 72 is caused to engage the contact associated with the particular resistor and the resistor assigned to a particular illumination hue or color, accurate and reproducible results will be obtained.

After a film sample 296 of the FIGURE 5 is positioned under the guides 292 and 294 on the carriage 290, the start push button 250 of the FIGURE 4 is closed so that the motor 284 commences advancing the carriage and commutator bar in a manner previously set forth. Prior to the positioning of the film sample 296 of the FIGURE 5 between the light source 70 of the FIGURE 2 and the photomultiplier tube 184 of the FIGURE 3A, no voltage is indicated to the voltage-to-frequency converter 24 so that a reference value is established. Subsequently, as the motor 284 of the FIGURE 4 continues to drive the carriage 290 of the FIGURE 5, the film sample will become aligned with the light source 70 and the photomultiplier tube 184 so that a current flows in the photomultiplier tube 184 which is proportional to the density or quantity of light conducted through the film sample 296. Accordingly, the current in the tube 136 of the FIGURE 3B changes which is reflected in the circuit path to the pentode 144, the conductor 172, the conductor 158 (FIGURE 3A) through the resistors 236 and 234 and the conductor 22 which is an input to the voltage-to-frequency converter 24. The exposure or interrogation period is permitted for a predetermined time, such as for 100 milliseconds and when an aperture 300 of the FIGURES 5 and 6 becomes aligned with the light pipe 306 and the reset photoelectric cell 302, the relay coil 314 is energized so as to open the contacts 316 associated therewith. This action causes a reset function so as to permit the frequency counter 28 to totalize. During the 100 millisecond exposure period, a voltage is supplied to the voltage to frequency converter 24 which is converted to a frequency proportional to the magnitude of the supplied voltage. As set forth, the output frequency of the voltage-to-frequency converter 24 is determined by the frequency counter 28 and applied via a group of conductors 30 to the decoder of the FIGURES 7 and 8.

The input of the circuit of the FIGURE 7 of the conductor 30 is in binary coded decimal form and through the cooperation of the relay contacts of the FIGURE 8 with the relays of the FIGURE 7, a decimal notation is derived on the output conductors 34 of the FIGURE 8, in the manner set forth regarding the operation of that circuit.

The information from the decoder 32 of the FIGURE 8 is supplied to the card punch 36 along with information from the identification keyboard 54 of the FIGURE 1 so that the density values as determined from the film sample are punched in the cards available for punching to the card punch 36. In addition to the foregoing information, the filter wheel selector switch 44 provides information relating to the particular hue to which the sample was exposed.

Thus, the present invention may be embodied in other specific forms without departing from the spirit and the essential characteristics of the invention.

What is claimed is:

1. Apparatus for yielding a manifestation indicative of optical density comprising a source of illumination, a phototube responsive to said source of illumination, means for maintaining a sample between said source of illumination and said phototube, an amplifier coupled to said phototube for converting the output of said phototube to a D.C. voltage, the output of said phototube being indicative of the optical density of said sample, a voltage-to-frequency converter for yielding a signal having a frequency related to the magnitude of said D.C. voltage, a frequency converter coupled to receive said signal and indicate the frequency so counted in a binary coded decimal (BCD) notation, means for converting the BCD notation to a decimal code, and means for recording the decimal code which is indicative of the optical density of said sample wherein said means for maintaining a sample between said source of illumination and said phototube includes a carriage, means associated with said carriage for receiving a sample, and a commutator bar supported by said carriage and bearing a plurality of apertures corresponding to interrogation portions of said sample.

2. The apparatus as defined in claim 1 including a second phototube in correspondence with said apertures and responsive to an illumination means and means coupled to said second phototube for generating a reset signal to said frequency counter upon alignment of said illumination means, one of said apertures, and said second phototube.

3. The apparatus as defined in claim 1 including means for advancing said carriage to thereby expose successive apertures.

4. The apparatus as defined in claim 1 including a sample in the form of a film strip received on said carriage.

5. The apparatus as defined in claim 1 wherein said amplifier includes a detector for detecting current flow in said phototube.

6. The apparatus as defined in claim 1 including means for varying the intensity of said source of illumination.

7. The apparatus as defined in claim 1 including means for selectively varying the hue generated by said source of illumination.

8. The apparatus as defined in claim 1 wherein said means for recording is a card punch adapted to receive and record external sample identification information as well as optical density information.

9. The apparatus as defined in claim 1 including means for exposing a sample to different selected hues and means for indicating to said card punch the selected hue.

References Cited

UNITED STATES PATENTS 3,069,013   12/1962   Neubrech et al.
3,367,230   2/1968   Williams.

OTHER REFERENCES

"An Automatic Comparator for Meas. of Spectra," Steinhaus et al., Applied Optics, vol. 4, No. 7, July 1965, pp. 799–807.

"An Automatic Scanning and Printing Analog-to-Digital Densitometer," Gatzek et al., IRE, Trans. on Bio-Med. Electronics, vol. 9, April 1962, pp. 81–84.

"An Automatic Integrating Microdensitometer," Drenth et al., J. Sci. Instr., 1965, vol. 42, pp. 222–4.

"The Progress of Automation of Photographic Dosimetry," April 1964, Heard, J. Photog. Sci. vol. 12, 1964, pp. 312–18.

"Automatic Recording and Analyzing Densitometer for Refl. & Trans. Densities," M. H. Sweet, Phot. Sci. & Eng. 3 (3), May-June 1959, pp. 101–109.

"An Improved P-M Tube Color Densitometer," Sweet, J.S.M.P.T.E., 54, January 1950, pp. 35, 52–55.

"An Analytical Recording Densitometer," White et al., Phot. Sci. & Eng., 2 (3), October 1958, pp. 164–169.

"Design and Operation of a New Automatic Comparator for Measurement of Spectra," Steinhaus et al., Los Alamos Sci. Lab. Reprt. LA–3100 (1964).

JEWELL H. PEDERSEN, Primary Examiner

R. J. WEBSTER, Assistant Examiner

U.S. Cl. X.R.

356—177, 189; 540—347; 235—155